United States Patent
Yoshida et al.

(10) Patent No.: US 7,488,081 B2
(45) Date of Patent: Feb. 10, 2009

(54) MIRROR DEVICE FOR A VEHICLE

(75) Inventors: Shigeki Yoshida, Aichi-ken (JP); Isao Sumi, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 300 days.

(21) Appl. No.: 11/580,022

(22) Filed: Oct. 13, 2006

(65) Prior Publication Data

US 2007/0092368 A1   Apr. 26, 2007

(30) Foreign Application Priority Data

Oct. 14, 2005   (JP)   ............... 2005-300619

(51) Int. Cl.
  *G02B 5/08*   (2006.01)
  *G02B 7/182*   (2006.01)
  *B60R 1/06*   (2006.01)

(52) U.S. Cl. ..................... 359/841; 359/877

(58) Field of Classification Search ................. 359/841, 359/872, 877
See application file for complete search history.

(56) References Cited

U.S. PATENT DOCUMENTS

| | | | | |
|---|---|---|---|---|
| 5,579,178 A * | 11/1996 | Mochizuki | ................. | 359/841 |
| 5,594,590 A | 1/1997 | Ishiyama | | |
| 6,793,358 B2 * | 9/2004 | Sakata | ................. | 359/872 |
| 6,811,270 B2 * | 11/2004 | Yoshida | ................. | 359/841 |
| 6,866,392 B2 * | 3/2005 | Hayashi | ................. | 359/841 |
| 6,979,091 B2 * | 12/2005 | Ichikawa | ................. | 359/872 |
| 7,104,660 B2 * | 9/2006 | Sakata et al. | ................. | 359/841 |
| 7,290,890 B2 * | 11/2007 | Yoshida et al. | ................. | 359/841 |
| 7,298,061 B2 * | 11/2007 | Kyoden | ................. | 310/68 R |
| 2006/0238907 A1 * | 10/2006 | Onuki et al. | ................. | 359/877 |
| 2008/0084623 A1 * | 4/2008 | Onuki | ................. | 359/841 |

FOREIGN PATENT DOCUMENTS

| | | |
|---|---|---|
| CN | 1213346 A | 4/1999 |
| EP | 1 445 150 A1 | 8/2004 |
| JP | 11-59275 A | 3/1999 |
| JP | 2001-151020 A | 6/2001 |
| JP | 2003-54318 A | 2/2003 |

* cited by examiner

*Primary Examiner*—Ricky D Shafer
(74) *Attorney, Agent, or Firm*—Roberts Mlotkowski Safran & Cole, P.C.; Thomas W. Cole (57) ABSTRACT

A retracting mechanism, which rotates a mirror for viewing a region substantially to a rear of the vehicle, has a motor, a cover which accommodates another end side of the motor, and a case main body which accommodates one end side of the motor and is rotatably supported at a vehicle body. In the retracting mechanism, the case main body and the cover are positioned due to a first fit-together portion, which is provided at a hanging-down wall of the cover, and a second fit-together portion, which is provided at a standing wall of the case main body, fitting-together with one another. The first fit-together portion and the second fit-together portion are both formed in shapes which are concentric with a rotating shaft. Accordingly, accuracy of positioning the case main body and the cover can be ensured to be good with the rotating shaft as a reference.

10 Claims, 7 Drawing Sheets

MIRROR DEVICE FOR A VEHICLE

CROSS-REFERENCE TO RELATED APPLICATION

This application claims priority under 35 USC 119 from Japanese Patent Application No. 2005-300619, the disclosure of which is incorporated by reference herein.

BACKGROUND OF THE INVENTION

1. Field of the Invention

The present invention relates to a mirror device for a vehicle.

2. Description of the Related Art

For example, a retracting mechanism, which rotates a mirror by the driving force of a motor, is provided at a door mirror device for a vehicle (see, for example, Japanese Patent Application Laid-Open (JP-A) No. 2001-151020). The retracting mechanism has a case which houses the motor. The case is structured so as to be divided into two sections which are a case main body and a cover. The cover is positioned with respect to the case main body by the side wall of the cover being fit-together with the side wall of the case main body.

However, in such a door mirror device for a vehicle, the main body portion of the motor is supported at both the case main body and the cover, and the output shaft of the motor is pivotally-supported at a shaft receiving hole provided in the case main body. Therefore, dimensional errors and assembly errors between the case main body and the cover affect the accuracy of assembling the motor main body portion with respect to the case, i.e., the accuracy of the axial center of the output shaft with respect to the shaft receiving hole.

SUMMARY OF THE INVENTION

In view of the aforementioned, an object of the present invention is to provide a mirror device for a vehicle having good accuracy of the axial center of the output shaft of a motor.

In order to achieve the above object, a mirror device for a vehicle relating to a first aspect of the present invention is a mirror device for a vehicle having a mirror for viewing a region substantially to a rear of the vehicle, and a retracting mechanism which rotates the mirror one of directly and indirectly, wherein the retracting mechanism has: a motor having a main body portion, and an output shaft projecting from one end portion of the main body portion; a cover having a first accommodating wall which accommodates at least another end side of the main body portion and at which is provided a first fit-together portion which is formed in a shape concentric with the output shaft, and a supporting portion which engages with another end portion of the main body portion and supports the main body portion; and a case main body having a second accommodating wall which accommodates at least one end side of the main body portion and at which is provided a second fit-together portion which is formed in a shape concentric with the output shaft and fits-together with the first fit-together portion, and a pivotally-supporting portion which pivotally-supports the output shaft, the case main body being rotatably supported at a rotation supporting portion provided at a vehicle body, and rotating together with the cover and the motor around the rotation supporting portion due to rotational force of the output shaft being transferred to the rotation supporting portion.

In the mirror device for a vehicle of the above-described aspect, when the output shaft of the motor of the retracting mechanism rotates, the case main body rotates, together with the cover and the motor, around the rotation supporting portion. In this way, the mirror, which is mounted to at least one of the case main body and the cover, rotates around the rotation supporting portion.

Here, in the retracting mechanism of this mirror device for a vehicle, the case main body and the cover are positioned due to the first fit-together portion, which is provided at the first accommodating wall of the cover which accommodates at least the other end side of the main body portion of the motor, and the second fit-together portion, which is provided at the second accommodating wall of the case main body which accommodates at least the one end side of the main body portion of the motor, fitting-together with one another. The first fit-together portion and the second fit-together portion are both formed in shapes which are concentric with the output shaft. Accordingly, with the output shaft as the reference, the accuracy of positioning the case main body and the cover can be ensured to be good. Therefore, the accuracy of positioning the pivotally-supporting portion of the case main body which pivotally-supports the output shaft, and the supporting portion of the cover which supports the motor main body portion, can be ensured to be good. In this way, the accuracy of the axial center of the output shaft can be made to be good.

In the mirror device for a vehicle relating to the above-described first aspect, the first accommodating wall of the cover and the second accommodating wall of the case main body may be formed in shapes concentric with the output shaft.

In the mirror device for a vehicle of the above-described structure, the structure is simple because the first fit-together portion and the second fit-together portion, which are formed in shapes which are concentric with the output shaft and which fit-together with one another, are provided at the first accommodating wall and the second accommodating wall which similarly are formed in shapes concentric with the output shaft.

The mirror device for a vehicle relating to the above-described first aspect may be structured such that a projecting portion having an outer periphery which is of a shape concentric with the output shaft is provided at another end portion of the main body portion of the motor, and the supporting portion of the cover has an inner periphery which is of a shape concentric with the output shaft, and the inner periphery of the supporting portion engages one of directly and indirectly with the outer periphery of the projecting portion.

In the mirror device for a vehicle of the above-described structure, due to the inner periphery of the supporting portion of the cover engaging with the outer periphery of the projecting portion which is provided at the other end portion of the main body portion of the motor, the motor main body portion is supported at the cover. The outer periphery of the projecting portion and the inner periphery of the supporting portion are both formed in shapes which are concentric with the output shaft. Accordingly, the accuracy of positioning the motor main body portion with respect to the cover can be ensured to be good, with the output shaft as the reference.

In the mirror device for a vehicle relating to the above-described first aspect, elastic bodies may be interposed between the main body portion of the motor and the case main body, and between the main body portion of the motor and the supporting portion of the cover.

In the mirror device for a vehicle of the above-described structure, the transfer of the vibration of the main body portion of the motor to the case main body and the cover can be suppressed. The operational sound can thereby be reduced.

As described above, in the mirror device for a vehicle of the present invention, the accuracy of the axial center of the output shaft of the motor can be made to be good.

DETAILED DESCRIPTION OF THE INVENTION

Figure 1:
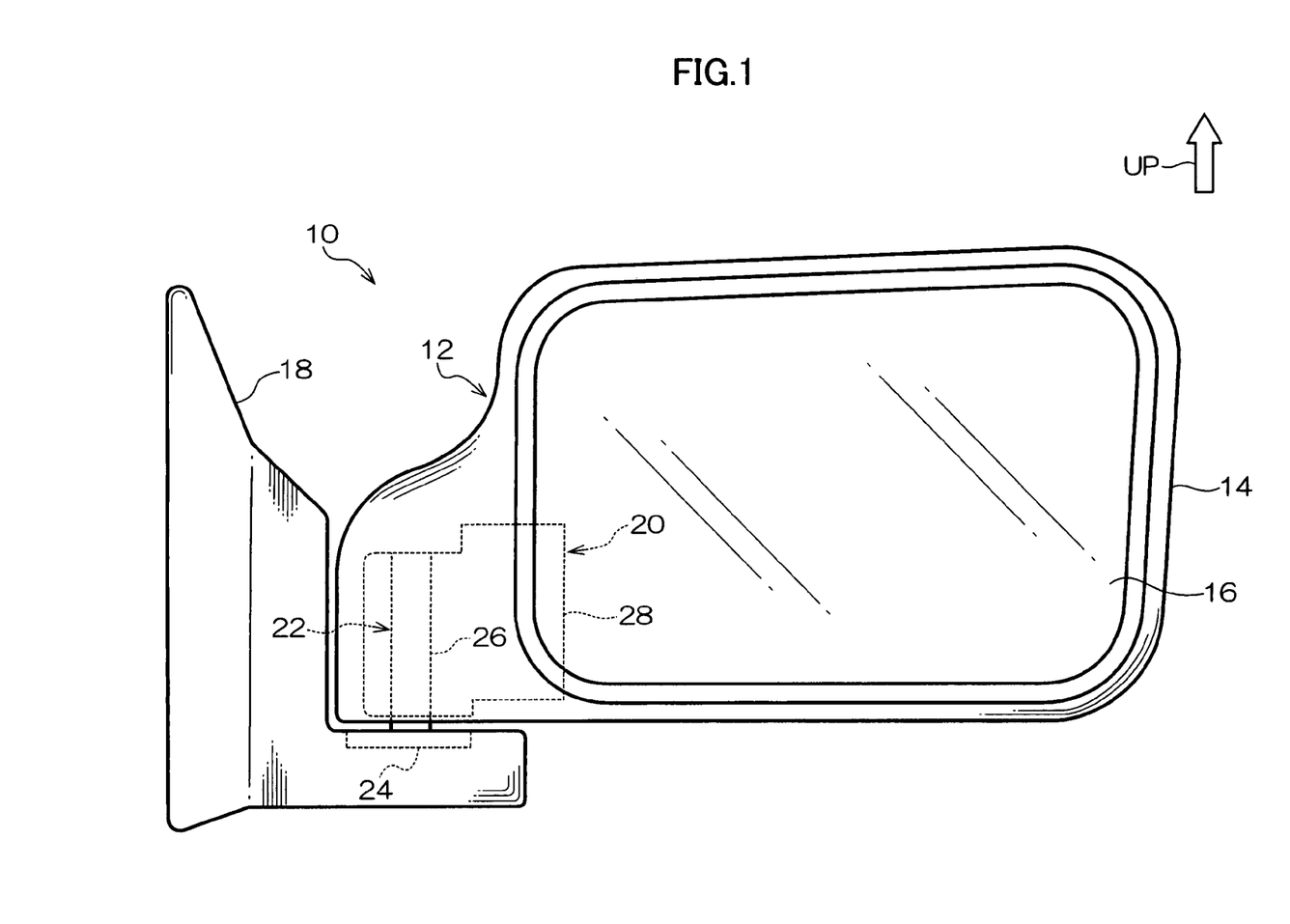
FIG. 1 is a plan view showing the schematic structure of a mirror device for a vehicle relating to an embodiment of the present invention.

The schematic structure of a door mirror device 10, which serves as a mirror device for a vehicle relating to an embodiment of the present invention, is shown in a front view in FIG. 1.

Note that arrow UP in the drawings denotes the upward direction of the vehicle. Further, the directions of "up" and "down" used in the following description are the directions in the state in which the present door mirror device 10 is mounted to a vehicle.

The door mirror device 10 has a door mirror main body 12. The door mirror main body 12 has a visor 14. A mirror 16 for viewing a region substantially to a rear of the vehicle is supported at the inner side of the visor 14.

The door mirror device 10 has a stay 18 which is fastened and fixed to an unillustrated door panel of the vehicle. A retracting mechanism 20 is provided between the stay 18 and the door mirror main body 12.

Figure 2:
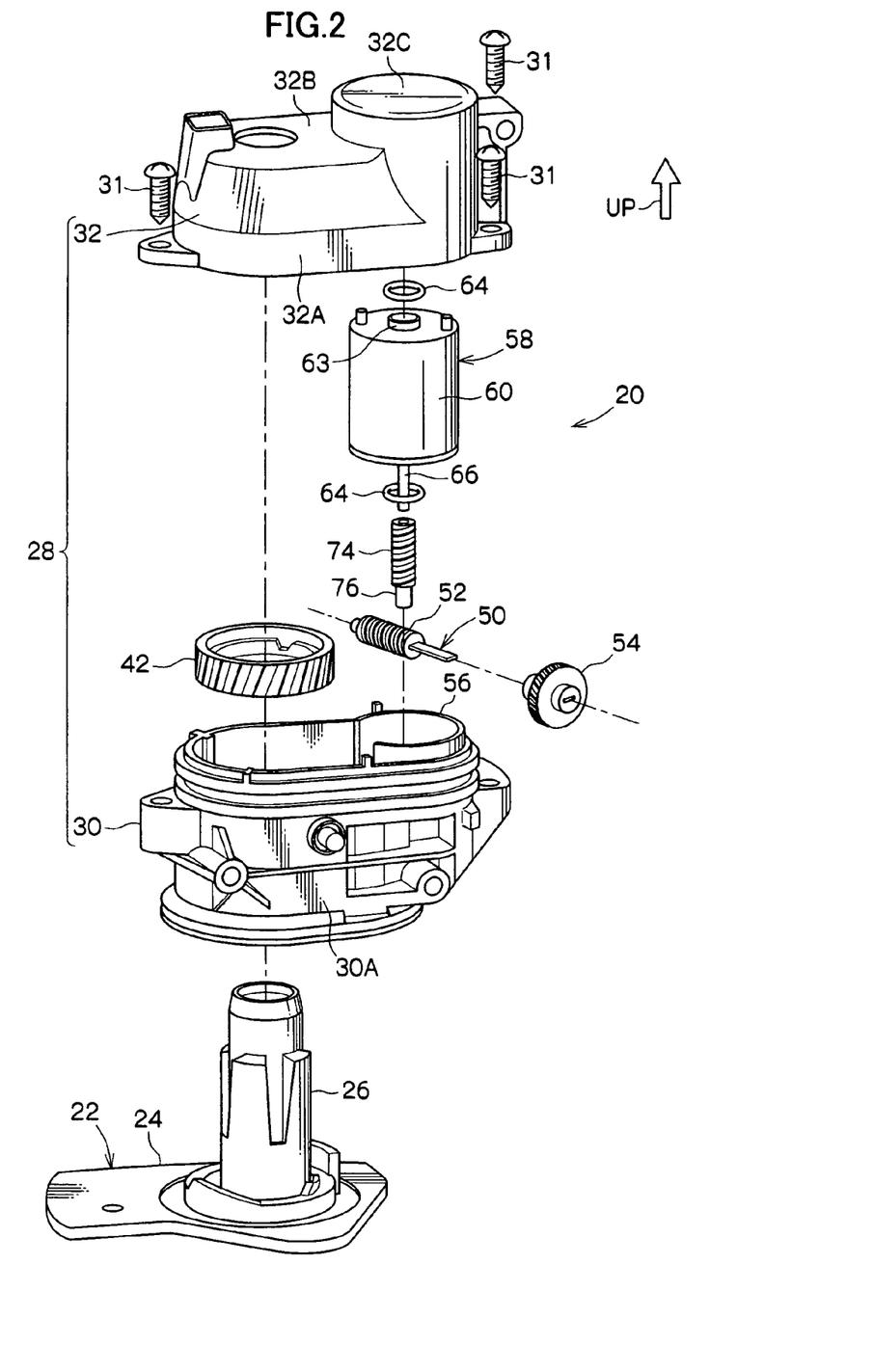
FIG. 2 is an exploded perspective view showing the structure of a retracting mechanism of the mirror device for a vehicle relating to the embodiment of the present invention.
Figure 3:
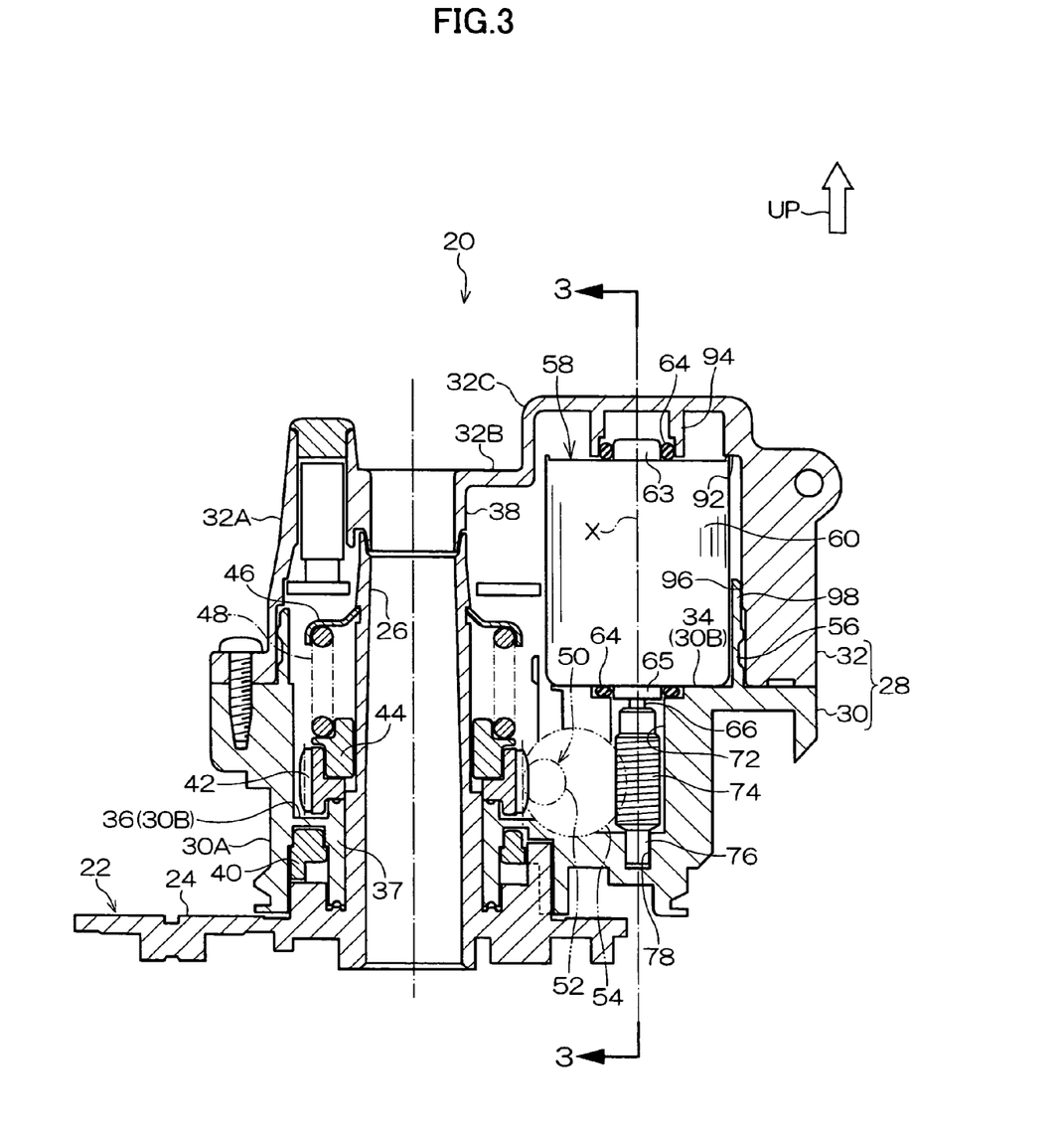
FIG. 3 is a longitudinal sectional view showing the structure of the retracting mechanism of the mirror device for a vehicle relating to the embodiment of the present invention.
Figure 4:
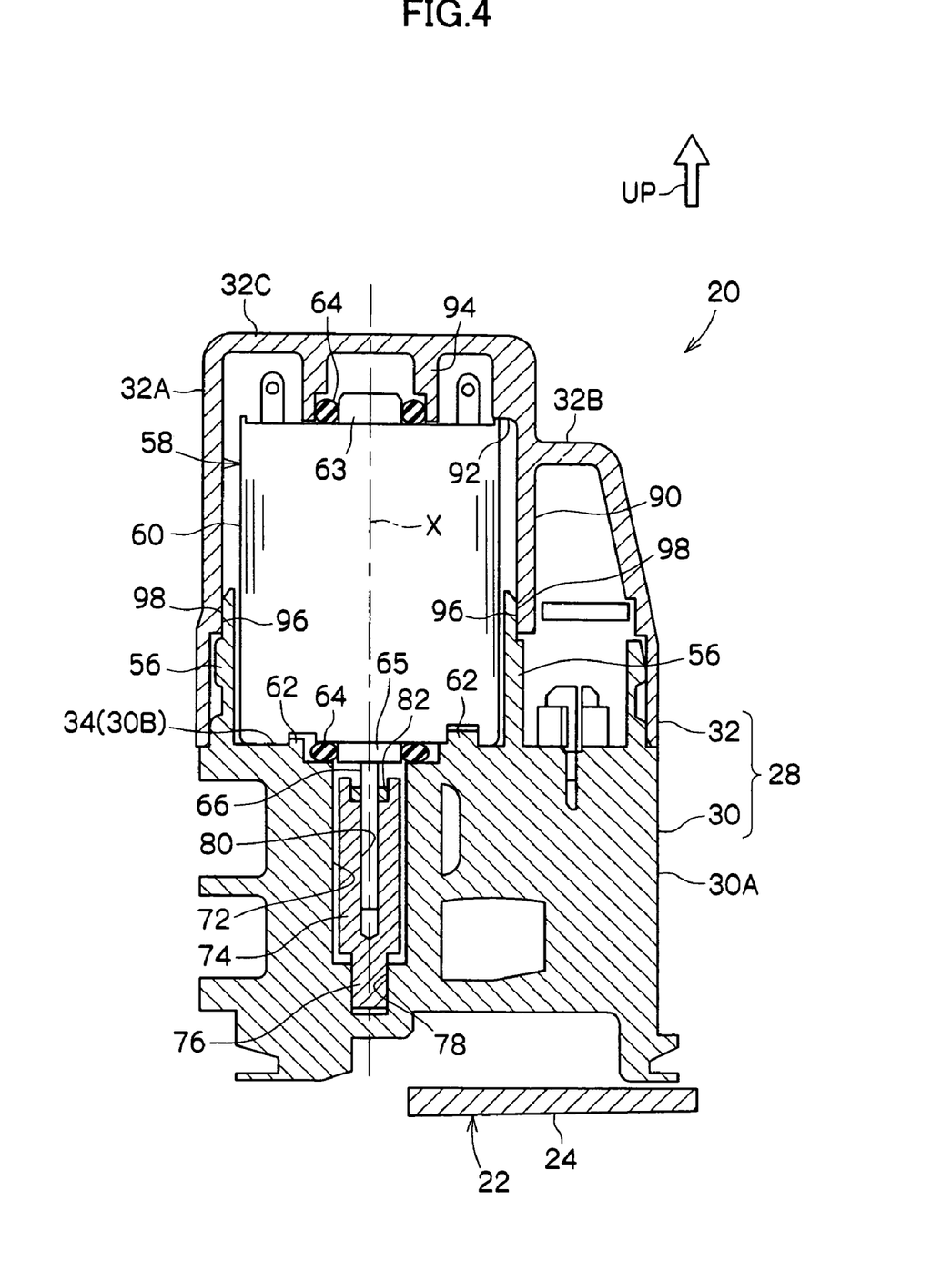
FIG. 4 is a sectional view taken along line 3-3 of FIG. 3.

The structure of the retracting mechanism 20 is shown in an exploded perspective view in FIG. 2, and the overall structure of the retracting mechanism 20 is shown in a longitudinal sectional view in FIG. 3. Further, a longitudinal sectional view taken along line 3-3 of FIG. 3 is shown in FIG. 4. Note that illustration of some of the structural members is omitted from FIG. 2.

As shown in these drawings, the retracting mechanism 20 has a stand 22. The stand 22 has a fixed portion 24 which is fixed to the stay 18, and a supporting shaft 26 which is shaped as a cylindrical tube and serves as a rotation supporting portion and stands erect integrally at the top side of the fixed portion 24.

The retracting mechanism 20 has a case 28. The case 28 has a case main body 30 and a cover 32. The case main body 30 has a side wall 30A and a floor wall 30B. The cover 32 has a side wall 32A and a top wall 32B, and is mounted to the case main body 30 by the lower end portion of the side wall 32A being fit-together with the upper end portion of the side wall 30A of the case main body 30. The case main body 30 and the cover 32 are fastened and fixed by a plurality of (three in the present embodiment) screws 31.

The floor wall 30B of the case main body 30 is formed in a stepped shape having an upper step portion 34 and a lower step portion 36. A shaft receiving portion 37 (see FIG. 3) shaped as a cylindrical tube is formed at the lower step portion 36. The supporting shaft 26 is freely-rotatably inserted through the shaft receiving portion 37. Further, a cylindrical-tube-shaped supporting portion 38 is formed at the top wall 32B of the cover 32 so as to project downward. The supporting portion 38 is freely-rotatably fit-together with the distal end of the supporting shaft 26. The case 28 is thereby freely-rotatably supported at the supporting shaft 26.

An unillustrated frame is mounted by screws to the case main body 30 and the cover 32. The frame is connected to the visor 14. The door mirror main body 12 (i.e., the mirror 16) is thereby able to rotate integrally with the case 28 around the supporting shaft 26.

Note that, as shown in FIG. 3, a detent plate 40 is disposed between the lower step portion 36 of the case main body 30 and the fixed portion 24 of the stand 22. The range of rotation of the case 28 with respect to the supporting shaft 26 is limited to a predetermined range.

Figure 5:
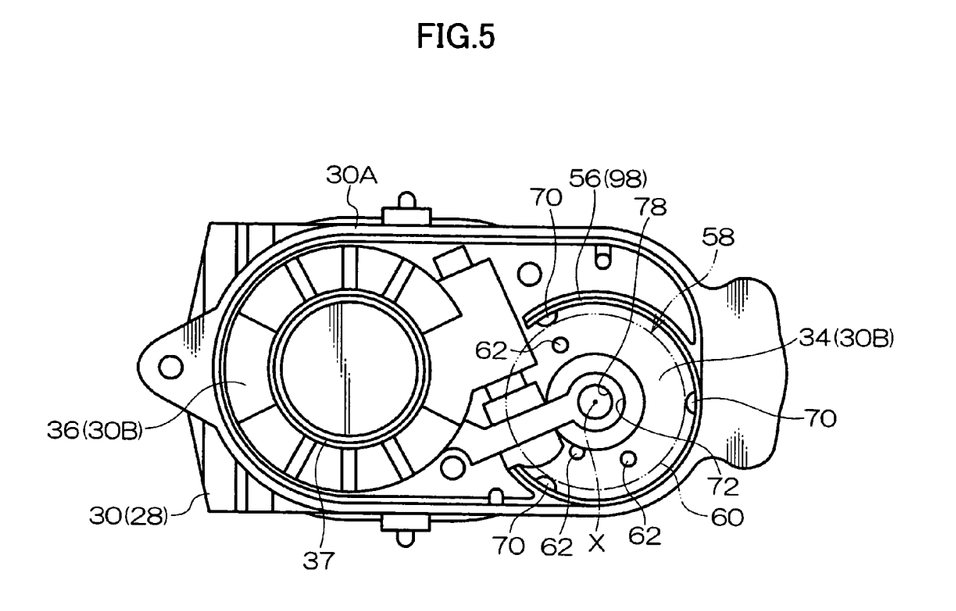
FIG. 5 is a plan view showing, from the direction opposite arrow UP of FIG. 3, the structure of a case main body of the mirror device for a vehicle relating to the embodiment of the present invention.

A standing wall 56 serving as a second accommodating wall is provided at the upper step portion 34 of the case main body 30. As shown in FIG. 5, a portion of the standing wall 56 is formed integrally with the side wall 30A of the case main body 30. The shape of the standing wall 56, as seen from the axial direction of the shaft receiving portion 37, i.e., the supporting shaft 26, is C-shaped, and the supporting shaft 26 side of the standing wall 56 is open.

The region at the lower end side of a housing 60, which structures the main body portion of a motor 58, is accommodated at the inner side of the standing wall 56. The housing 60 is formed in the shape of a cylindrical tube whose both top and bottom end portions are subjected to drawing processing. Downward displacement of the housing 60 is restricted due to the bottom end portion thereof abutting the upper step portion 34 via an O-ring 64. Note that the O-ring 64 is disposed within a groove which is formed in the upper step portion 34. Further, relative rotation of the housing 60 with respect to the case main body 30 is restricted due to three detent projections 62 (see FIG. 5), which are formed in the shape of solid cylinders and which project at the upper step portion 34 of the case main body 30, fitting-together with unillustrated round holes which are formed in the bottom end portion of the housing 60.

A bearing accommodating portion 63, which serves as a projecting portion and is formed in the shape of a cylindrical tube having a floor, projects-out at the top end portion of the housing 60. An unillustrated bearing is accommodated within the bearing accommodating portion 63. One axial direction end portion of a rotating shaft 66, which structures the output shaft of the motor 58, is pivotally-supported by this bearing. Further, a bearing accommodating portion 65, which is formed in the shape of a cylindrical tube, projects-out at the bottom end portion of the housing 60. An unillustrated bearing is accommodated within the bearing accommodating portion 65, and the axial direction intermediate portion of the rotating shaft 66 is pivotally-supported thereby. The rotating shaft 66 is thereby freely-rotatably supported at the housing 60. Note that the outer periphery of the housing 60, the outer periphery of the bearing accommodating portion 63, and the outer periphery of the bearing accommodating portion 65 are formed in shapes which are concentric with the rotating shaft 66.

The inner periphery and the outer periphery of the standing wall 56 are formed in shapes which are concentric with the outer periphery of the housing 60 and the rotating shaft 66. Three crush ribs 70 serving as press-contact portions project-out at the inner periphery of the standing wall 56. These crush ribs 70 are disposed at uniform intervals along the peripheral direction of the standing wall 56. The respective distal end portions of the crush ribs 70 press-contact the outer periphery of the housing 60.

Namely, at the door mirror device 10, the motor 58 is assembled to the case main body 30 by the housing 60 being press-fit-in at the inner side of the standing wall 56. Due to the respective distal end portions of the three crush ribs 70 being crushed slightly at the time when the housing 60 is press-fit-in, the distal end portions of the three crush ribs 70 are pressed against the outer periphery of the housing 60. Further, the three crush ribs 70 hold the housing 60 such that the outer periphery of the housing 60 and the inner periphery of the standing wall 56 are concentric.

On the other hand, the axial direction other end side of the rotating shaft 66 of the motor 58 projects-out downward from the housing 60, and is accommodated within a gear accommodating hole 72 which is formed in the case 28. The gear accommodating hole 72 is formed in a shape concentric with the rotating shaft 66. A worm gear 74, which structures the output shaft, is accommodated within the gear accommodating hole 72.

Figure 6:
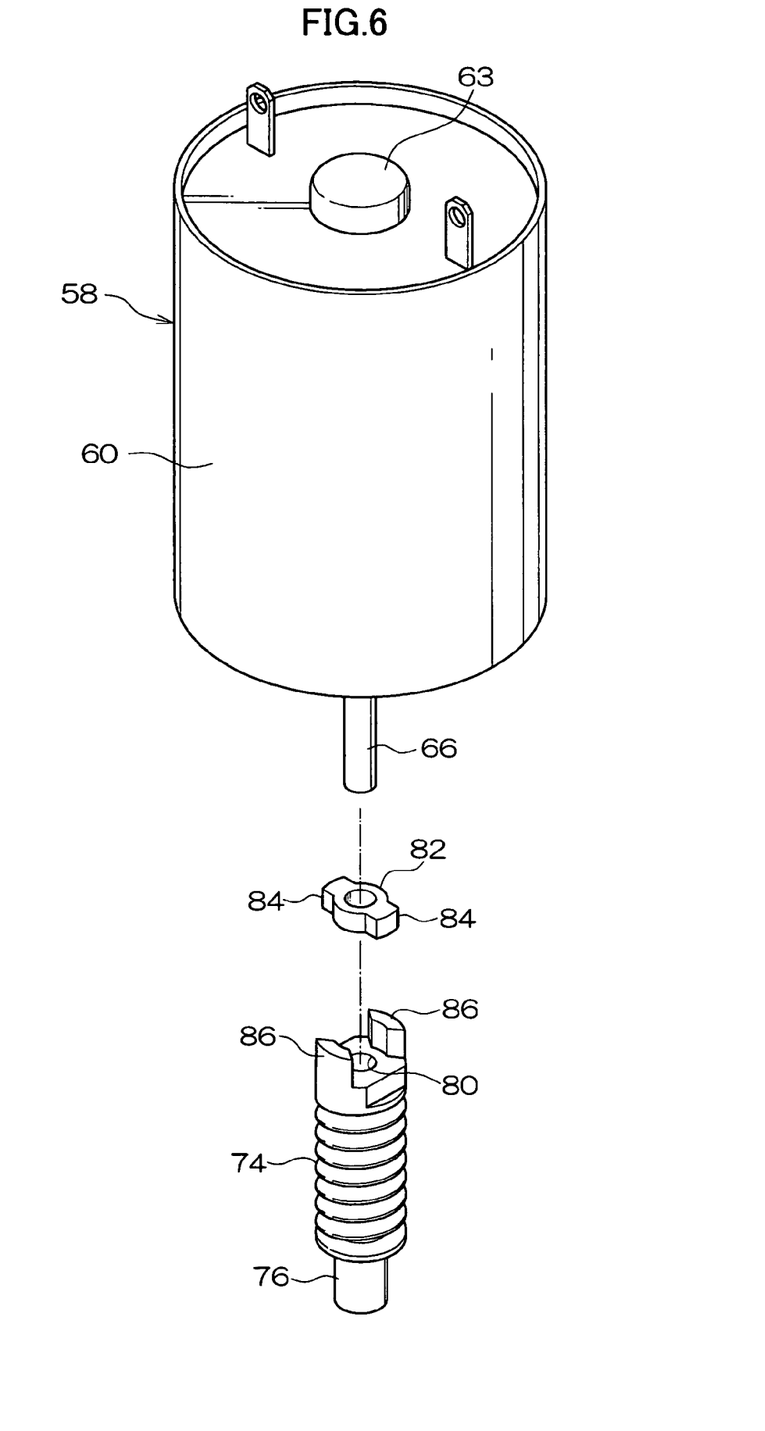
FIG. 6 is an exploded perspective view showing the structure of a motor and a worm gear of the mirror device for a vehicle relating to the embodiment of the present invention.

As shown in FIGS. 4 and 6, a connecting hole 80 which is round is formed coaxially in the upper end portion of the worm gear 74. The axial direction other end portion of the rotating shaft 66 is inserted in the connecting hole 80 so as to rotate freely and so as to be movable in the axial direction. The worm gear 74 is disposed coaxially with respect to the rotating shaft 66. Further, a connecting ring 82 which is formed in the shape of a ring is press-fit and fixed to the rotating shaft 66. A pair of abutting projections 84, which project-out in the radial direction, are formed at the outer peripheral portion of the connecting ring 82. The pair of abutting projections 84 are provided opposite one another across the rotating shaft 66, and face a pair of abutted projections 86, which project-out upwardly from the top end portion of the worm gear 74, such that the abutting projections 84 can abut the abutted projections 86.

Namely, the worm gear 74 is connected so as to be able to rotate relative to the rotating shaft within a predetermined range, and so as to be able to move in the axial direction. When the rotating shaft 66 rotates, due to the pair of abutting projections 84 of the connecting ring 82 abutting the pair of abutted projections 86 of the worm gear 74, the rotational force of the rotating shaft 66 is transferred to the worm gear 74.

A shaft portion 76 which is shaped as a solid cylinder projects-out coaxially at the bottom end portion of the worm gear 74. This shaft portion 76 is freely-rotatably supported at a shaft receiving hole 78 which is round and serves as a pivotally-supporting portion and is formed in the floor portion of the gear accommodating hole 72. This shaft receiving hole 78 is formed in a shape which is concentric with the inner periphery of the standing wall 56.

Figure 7:
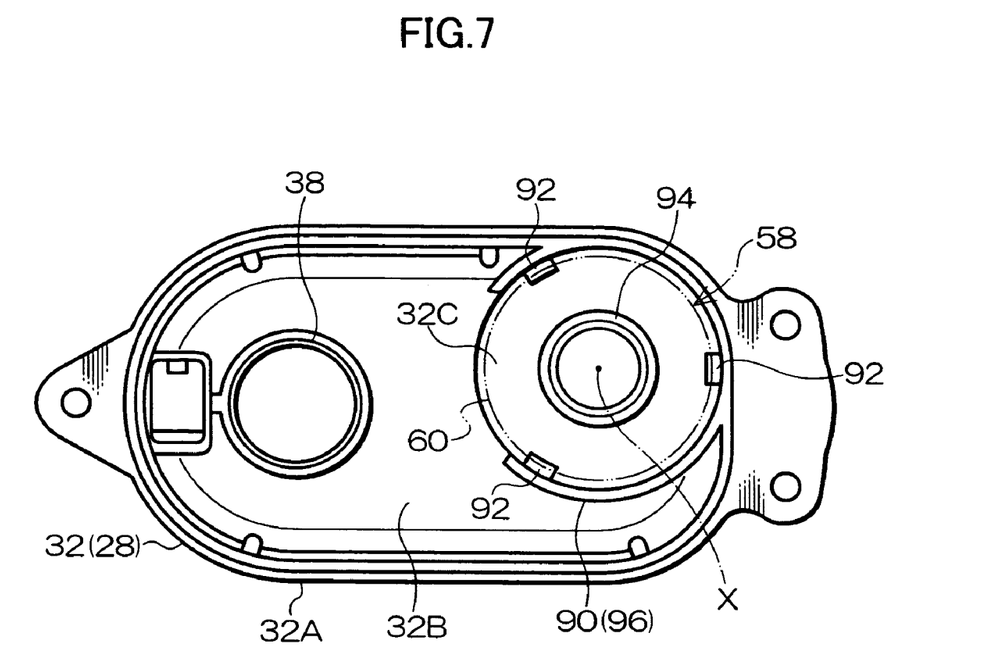
FIG. 7 is a plan view showing, from the direction of arrow UP of FIG. 3, the structure of a cover of the mirror device for a vehicle relating to the embodiment of the present invention.

On the other hand, a projecting/accommodating portion 32C, which is formed in the shape of a cylindrical tube having a floor and which projects upward, is provided at the top wall 32B of the cover 32. As shown in FIG. 7, at the inner side of the cover 32, a hanging-down wall 90 serving as a first accommodating wall extends downward from the opening portion of the projecting/accommodating portion 32C. A portion of the hanging-down wall 90 is formed integrally with the side wall 32A of the cover 32. The configuration of the hanging-down wall 90 as seen from the axial direction of the projecting/accommodating portion 32C is formed in a C-shape, and the supporting shaft 26 side thereof is open. Further, the hanging-down wall 90 is formed in a shape which is concentric with the projecting/accommodating portion 32C. The inner periphery of the hanging-down wall 90 is continuous with the inner periphery of the projecting/accommodating portion 32C without any step therebetween.

The region at the upper end side of the housing 60 of the motor 58 is accommodated at the inner side of the projecting/accommodating portion 32C and the hanging-down wall 90. Three abutting portions 92 are formed at the inner periphery of the projecting/accommodating portion 32C at uniform intervals along the peripheral direction thereof. The top end portion of the housing 60 abuts these three abutting portions 92. Upward displacement of the housing 60 is thereby restricted.

A supporting portion 94 which is shaped as a cylindrical tube projects-out downwardly at the floor surface of the projecting/accommodating portion 32C. The inner periphery and the outer periphery of the supporting portion 94 are formed in shapes concentric with the projecting/accommodating portion 32C and the hanging-down wall 90. The aforementioned bearing accommodating portion 63 of the housing 60 of the motor 58 is accommodated at the inner side of the supporting portion 94. The O-ring 64, which serves as an elastic body, is interposed between the inner periphery of the supporting portion 94 and the outer periphery of the bearing accommodating portion 63. The O-ring 64 supports the bearing accommodating portion 63, i.e., the housing 60, coaxially with the supporting portion 94.

A first fit-together portion 96, which is formed in a shape concentric with the rotating shaft 66 of the motor 58, is provided at the bottom end portion of the hanging-down wall 90. A second fit-together portion 98, which is formed in a shape which is concentric with the rotating shaft 66, is provided at the top end portion of the standing wall 56. The first fit-together portion 96 is fit-together with the outer side of the second fit-together portion 98. In this way, the hanging-down wall 90 and the standing wall 56 are connected concentrically, and the cover 32 is positioned with respect to the case main body 30.

Here, in the retracting mechanism 20, in the state in which the cover 32 and the case main body 30 are positioned as described above, the supporting portion 94 of the cover 32 is disposed coaxially to an axis X of the shaft receiving hole 78 of the case main body 30. Accordingly, in this state, the rotating shaft 66 of the motor 58, at which the bearing accommodating portion 63 (the housing 60) is supported coaxially to the supporting portion 94, and the worm gear 74 which is connected to the rotating shaft 66, are disposed coaxially to the axis X of the shaft receiving hole 78.

Namely, in the retracting mechanism 20, in the state in which the motor 58 and the worm gear 74 are assembled to the cover 32 and the case main body 30, the supporting portion 94 of the cover 32, the hanging-down wall 90 of the cover 32, the standing wall 56 of the case main body 30, the housing 60 of the motor 58, the rotating shaft 66 of the motor 58, and the worm gear 74 are all disposed coaxially to the axis X of the shaft receiving hole 78.

On the other hand, a gear plate 42 is disposed at the inner side of the case main body 30. The gear plate 42 is rotatably supported coaxially to the supporting shaft 26.

A clutch disc 44 is disposed at the side of the gear plate 42 which is opposite the side at which the lower step portion 36 of the case 28 is disposed. The clutch disc 44 is supported coaxially to the supporting shaft 26, and is movable in the axial direction and unable to rotate with respect to the supporting shaft 26. The clutch disc 44 has a convex portion which fits-together with a concave portion formed in the inner peripheral portion of the gear plate 42, and the clutch disc 44 and the gear plate 42 mesh-together and engage only at a predetermined position along the peripheral direction.

A teeth washer 46 is disposed at the side of the clutch disc 44 opposite the side at which the gear plate 42 is provided. The teeth washer 46 is mounted to the distal end portion of the supporting shaft 26 so as to be unable to move in the axial direction.

A tension coil spring 48 is disposed between the teeth washer 46 and the clutch disc 44. The tension coil spring 48 urges the clutch disc 44 in the direction of engaging with the gear plate 42. In this way, the state in which the gear plate 42 and the clutch disc 44 are meshed and engaged together is usually maintained, and relative rotation of the gear plate 42 with respect to the supporting shaft 26 is restricted.

Further, a worm shaft 50 serving as an intermediate gear is provided at a radial direction side of gear plate 42. The worm gear 50 is disposed in a state in which the axis thereof intersects the axis of the supporting shaft 26, and has a worm gear portion 52 which is meshed with the gear plate 42. A helical gear 54 is connected to one axial direction end side of the worm gear portion 52, so as to be unable to rotate relative to the worm shaft 50. The worm shaft 50 and the helical gear 54 are freely-rotatably supported at the case main body 30.

The helical gear 54 is meshed-together with the aforementioned worm gear 74. When the worm gear 74 rotates, the helical gear 54 is rotated integrally with the worm shaft 50 (the worm gear portion 52). In this way, due to the worm shaft 50 being rotated (revolved) around the gear plate 42, the case 28 is rotated around the supporting shaft 26, and the door mirror main body 12 (i.e., the mirror 16) can be retracted or extended.

Operation of the present embodiment will be described next.

In the door mirror device 10 of the above-described structure, due to the motor 58 of the retracting mechanism 20 being driven, the rotating shaft 66 is rotated, and the worm gear 74, the helical gear 54, and the worm shaft 50 (the worm gear portion 52) are rotated. In this way, the case 28 is rotated due to the reaction force of the rotational force imparted to the gear plate 42 of the supporting shaft 26. Therefore, the door mirror main body 12 is rotated integrally with the case 28, and is retracted or extended.

Here, in the retracting mechanism 20 of the door mirror device 10 relating to the present embodiment, the case main body 30 and the cover 32 are positioned due to the first fit-together portion 96, which is provided at the hanging-down wall 90 of the cover 32 which accommodates the upper end side of the housing 60 of the motor 58, and the second fit-together portion 98, which is provided at the standing wall 56 of the case main body 30 which accommodates the lower end side of the housing 60 of the motor 58, fitting-together with one another. The first fit-together portion 96 and the second fit-together portion 98 are both formed in shapes concentric with the rotating shaft 66. Accordingly, with rotating shaft 66 as the reference, the positioning accuracy of the case main body 30 and the cover 32 can be ensured to be good. Therefore, the positioning accuracy of the shaft receiving hole 78 of the case main body 30, which pivotally-supports the worm gear 74 which is connected coaxially to the rotating shaft 66, and the supporting portion 94 of the cover 32, which supports the housing 60, can be ensured to be good. The accuracy of the axial centers of the rotating shaft 66 and the worm gear 74 can thereby be made to be good. Accordingly, the meshing-together of the worm gear 74 and the helical gear 54 can be made stable, and in this way, operational noise of the retracting mechanism 20 can be reduced and the generation of abnormal sound can be prevented.

In the retracting mechanism 20 of the door mirror device 10 relating to the present embodiment, the structure is simple because the first fit-together portion 96 and the second fit-together portion 98, which are formed in shapes concentric with the rotating shaft 66 and which are fit-together with one another, are provided at the hanging-down wall 90 and the standing wall 56 which similarly are formed in shapes which are concentric with the rotating shaft 66.

Further, in the retracting mechanism 20 of the door mirror device 10 relating to the present embodiment, the housing 60 is supported at the cover 32 due to the inner periphery of the supporting portion 94 of the cover 32 engaging, via the O-ring 64, with the outer periphery of the bearing accommodating portion 63 provided at the top end portion of the housing 60 of the motor 58. The outer periphery of the bearing accommodating portion 63 and the inner periphery of the supporting portion 94 are both formed in shapes which are concentric with the rotating shaft 66. Accordingly, with the rotating shaft 66 as the reference, the accuracy of positioning the housing 60 with respect to the cover 32 can be ensured to be good.

Moreover, in the retracting mechanism 20 of the door mirror device 10 relating to the present embodiment, the O-rings 64 are interposed between the housing 60 and the upper step portion 34 of the case main body 30, and between the housing 60 of the motor 58 and the supporting portion 94 of the cover 32. Therefore, it is possible to suppress the transfer of vibration of the housing 60 to the case main body 30 and the cover 32, and the operational sound can thereby be reduced.

Note that the retracting mechanism 20 of the door mirror device 10 relating to the above-described embodiment is structured such that the shaft portion 76, which is provided at the worm gear 74, is pivotally-supported at the shaft receiving hole 78 which is formed in the case main body 30. However, the present invention is not limited to the same, and may be structured such that the worm gear is pivotally-supported at the case main body 30 due to a shaft portion, which projects-out from the case main body 30, being freely-rotatably fit-together with a round hole formed in the worm gear 74.

What is claimed is:

1. A mirror device for a vehicle having a mirror for viewing a region substantially to a rear of the vehicle, and a retracting mechanism which rotates the mirror one of directly and indirectly, wherein the retracting mechanism has:

a motor having a main body portion, and an output shaft projecting from one end portion of the main body portion;

a cover having a first accommodating wall which accommodates at least another end side of the main body portion and at which is provided a first fit-together portion which is formed in a shape concentric with the output shaft, and a supporting portion which engages with another end portion of the main body portion and supports the main body portion; and a case main body having a second accommodating wall which accommodates at least one end side of the main body portion and at which is provided a second fit-together portion which is formed in a shape concentric with the output shaft and fits-together with the first fit-together portion, and a pivotally-supporting portion which pivotally-supports the output shaft, the case main body being rotatably supported at a rotation supporting portion provided at a vehicle body, and rotating together with the cover and the motor around the rotation supporting portion due to rotational force of the output shaft being transferred to the rotation supporting portion.

2. The mirror device for a vehicle of claim 1, wherein a projecting portion having an outer periphery which is of a shape concentric with the output shaft is provided at another end portion of the main body portion of the motor, and the supporting portion of the cover has an inner periphery which is of a shape concentric with the output shaft, and the inner periphery of the supporting portion engages one of directly and indirectly with the outer periphery of the projecting portion.

3. The mirror device for a vehicle of claim 1, wherein elastic bodies are interposed between the main body portion of the motor and the case main body, and between the main body portion of the motor and the supporting portion of the cover.

4. The mirror device for a vehicle of claim 1, wherein the main body portion of the motor is assembled to the case main body by being press-fit-in at an inner side of the second accommodating wall.

5. The mirror device for a vehicle of claim 1, wherein a plurality of ribs are formed at an inner side of the second accommodating wall, and the main body portion of the motor is assembled to the case main body such that respective distal ends of the ribs press an outer surface of the main body portion of the motor.

6. A mirror device for a vehicle having a mirror for viewing a region substantially to a rear of the vehicle, and a retracting mechanism which rotates the mirror, wherein the retracting mechanism has:

a motor having a main body portion, and an output shaft projecting from one end portion of the main body portion;

a cover having a first accommodating wall which accommodates another end side of the main body portion, and a supporting portion which engages with another end portion of the main body portion and supports the main body portion; and a case main body having a second accommodating wall which accommodates one end side of the main body portion, and a pivotally-supporting portion which pivotally-supports the output shaft, the case main body being supported so as to be able to rotate with respect to a vehicle body, and due to rotation of the output shaft, the case main body rotates together with the cover and the motor with respect to the vehicle body, and wherein the first accommodating wall and the second accommodating wall respectively have a circular-arc-shaped wall surface formed in a shape concentric with the output shaft, and include a fitting-together structure at both wall surfaces.

7. The mirror device for a vehicle of claim 6, wherein a projecting portion having an outer periphery which is of a shape concentric with the output shaft is provided at another end portion of the main body portion of the motor, and the supporting portion of the cover has an inner periphery which is of a shape concentric with the output shaft, and the inner periphery of the supporting portion engages one of directly and indirectly with the outer periphery of the projecting portion.

8. The mirror device for a vehicle of claim 6, wherein elastic bodies are interposed between the main body portion of the motor and the case main body, and between the main body portion of the motor and the supporting portion of the cover.

9. The mirror device for a vehicle of claim 6, wherein the main body portion of the motor is assembled to the case main body by being press-fit-in at an inner side of the second accommodating wall.

10. The mirror device for a vehicle of claim 6, wherein a plurality of ribs are formed at an inner side of the second accommodating wall, and the main body portion of the motor is assembled to the case main body such that respective distal ends of the ribs press an outer surface of the main body portion of the motor.

* * * * *